Figure 1:
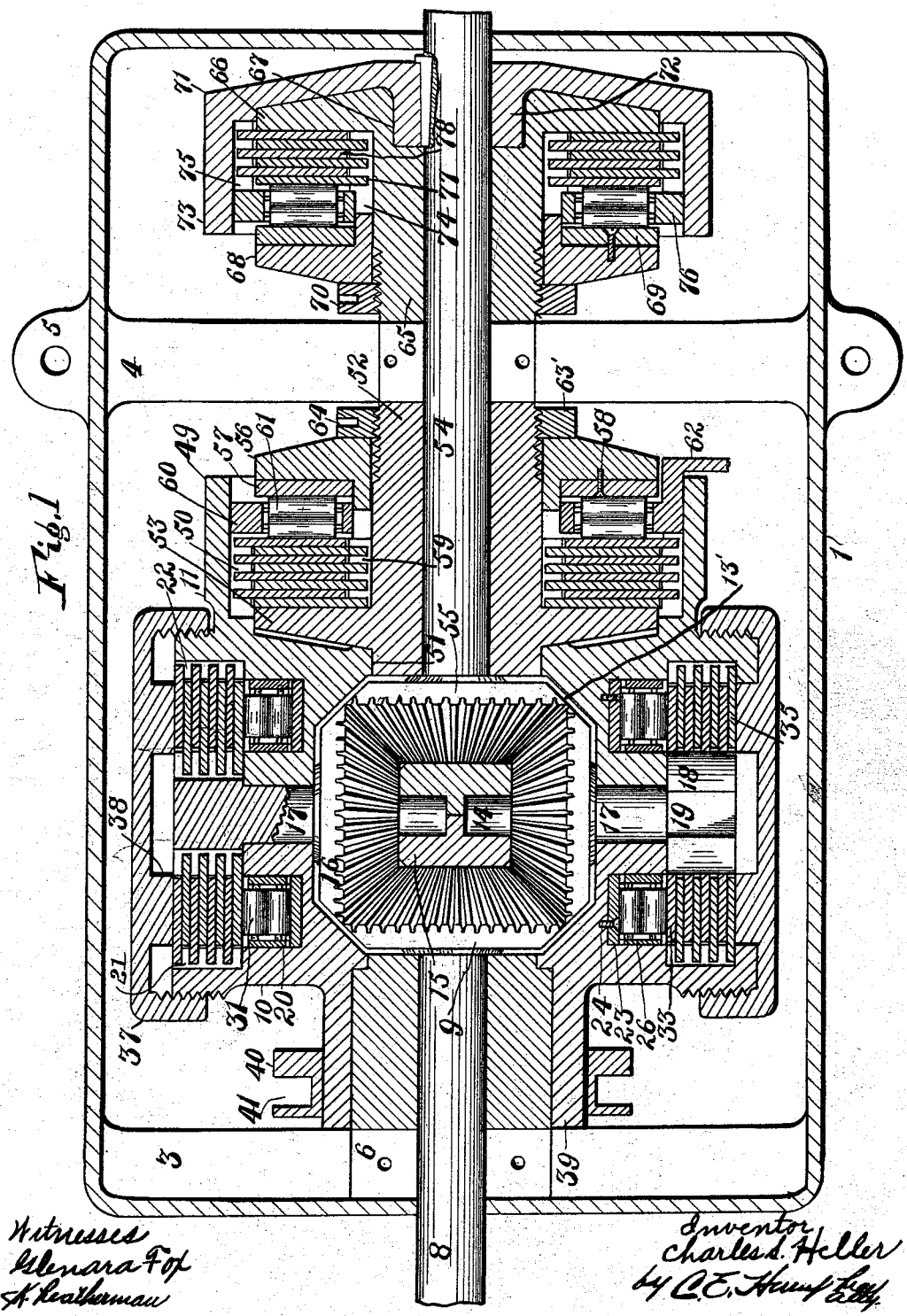

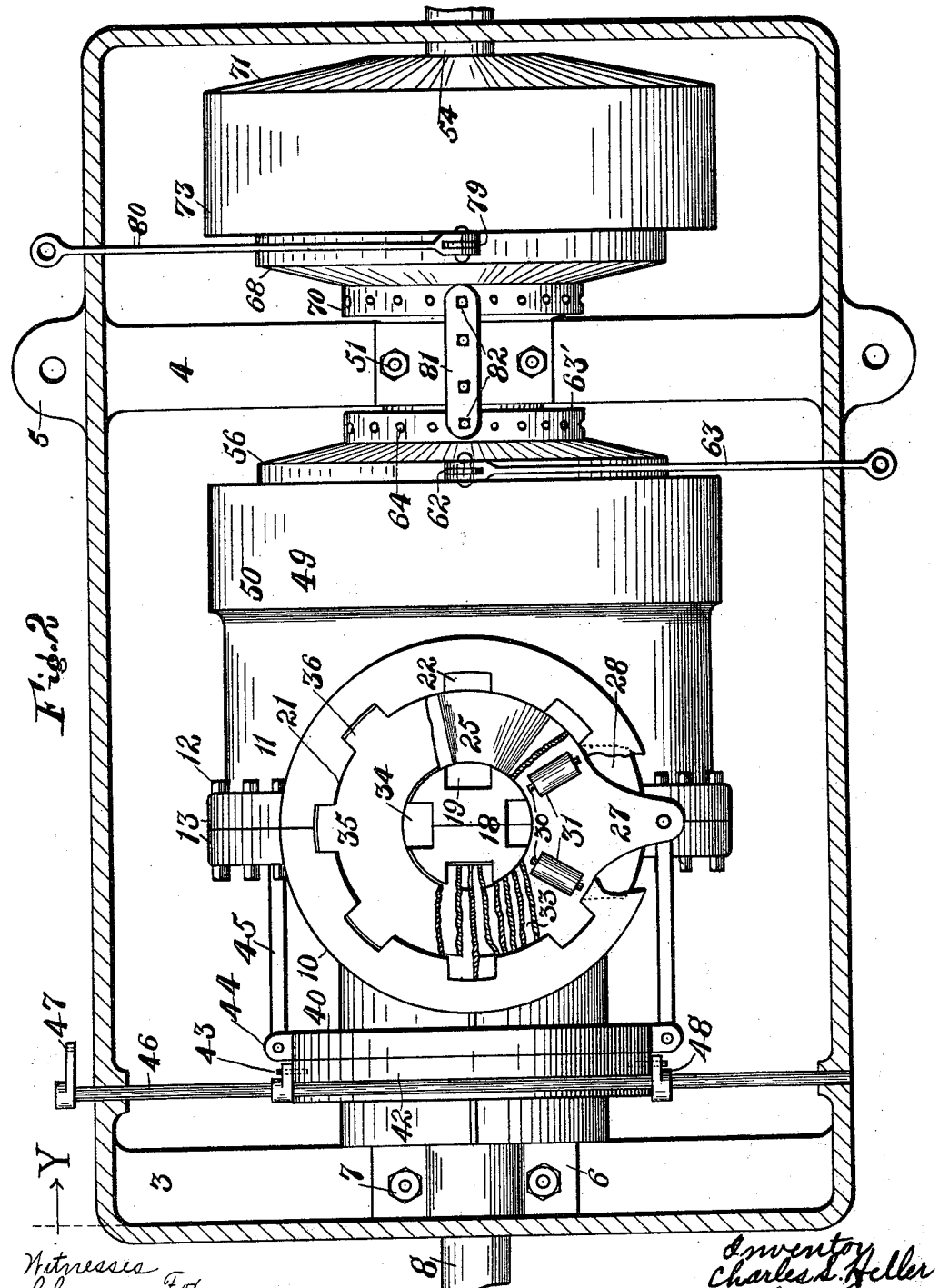

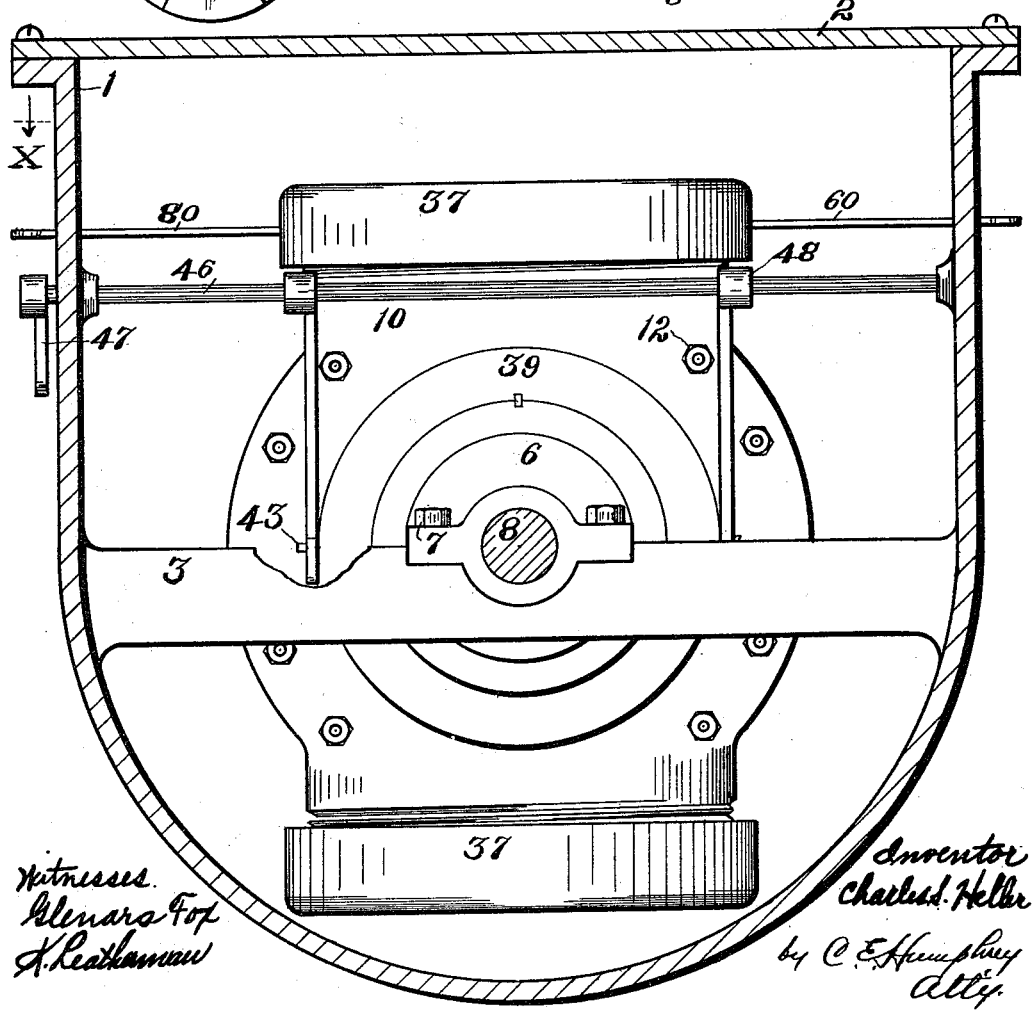

UNITED STATES PATENT OFFICE.

CHARLES S. HELLER, OF BARBERTON, OHIO, ASSIGNOR TO THE MOORE ARCHITECTURAL AND ENGINEERING COMPANY, OF AKRON, OHIO, A CORPORATION OF OHIO.

TRANSMISSION-GEARING.

1,000,406.     Specification of Letters Patent.     Patented Aug. 15, 1911.

Application filed April 30, 1910. Serial No. 558,676.

*To all whom it may concern:*

Be it known that I, CHARLES S. HELLER, a citizen of the United States, residing at Barberton, in the county of Summit and State of Ohio, have invented new and useful Improvements in Transmission-Gearing, of which the following is a specification.

This invention relates to transmission gearing especially adapted for use in connection with automobiles, and the object of the invention is to provide new and improved means whereby motion may be transmitted from a constantly-running driving-shaft to a driven-shaft and provided with mechanism whereby without interrupting the motion of the driving-shaft the rotation of the driven-shaft may be stopped or reversed, or the speed thereof changed, as desired; said mechanism also possessing the function of acting both as a service-brake and an emergency-brake. During the operation of the device as an emergency-brake the power of the driving-shaft may be so controlled as to render it possible for the user thereof to employ the power of the motor to resist the rotation of the driven-shaft.

The invention further contemplates providing a simple, strong, compact and serviceable device for the purpose described which can be readily installed and the operation of which has been found to be exceedingly simple and efficacious for the control of the transmission of motion from a driving-shaft to a driven-shaft.

With the foregoing and other objects in view, the invention consists in the novel construction, combination and arrangement of parts to be hereinafter referred to and illustrated in the accompanying drawings which form a part hereof wherein is shown the preferred embodiment of the invention, but it is to be understood that changes, variations and modifications can be resorted to which come within the scope of the claims hereunto appended.

In the drawings in which similar reference numerals indicate like parts in the different figures: Figure 1 is a view in central, longitudinal, horizontal section of a device embodying this invention. Fig. 2 is a sectional view of the device shown in Fig. 1 on line X of Fig. 3. Fig. 3 is a sectional view of the device shown in Fig. 1 on line Y of Fig. 2. Fig. 4 is a plan of one of the fixed brake members employed in this device. Fig. 5 is a view of one of the movable brake members. Fig. 6 is a plan view of the shifting-ring for throwing the various brake members into and out of braking relation. Fig. 7 is a plan of a fixed cam-ring employed in connection with this device; and, Fig. 8 is a view in side elevation of the mechanism employed for throwing the fixed and movable members of the brake into and out of braking engagement with each other.

In the drawings, the reference numeral 1 denotes an outer casing adapted to hold a quantity of oil to provide an oil bath for constantly lubricating the mechanism to be hereinafter described. This casing is preferably constructed of thin metal and provided with a cover 2 detachably held to the flanged upper open end of the casing 1. Extending transversely of the casing are two supporting arms 3 and 4. The casing 1 is also provided with one or more laterally-projecting apertured lugs 5 to provide means for attaching the casing to a fixed support. The transverse arm 3 is provided centrally with a recess in which is seated a journal bearing 6 held in position through the medium of holdfast devices 7 which extend into the arm 3. Mounted in the journal bearing 6 is a driving-shaft 8 provided on its inner end with a bevel driving-gear 9.

The mechanism by which motion from the driving-gear 9 is communicated to other mechanism to be later described is arranged to be mounted in a housing comprising complementary and coöperating members 10 and 11 which are adapted to be secured together through the medium of bolts 12 arranged to extend through similar laterally-projecting flanges 13 formed integrally with these members. The members 10 and 11 are provided in their opposing faces with centrally arranged recesses 13', said recesses adapted to register with each other when the two members are secured together by bolts 12. Extending across each recess 13' is a removable bar 15, said bars arranged to lie in abutting relation with each other when the members 10 and 11 are united. In the contacting faces of the bars 15 are registering semi-circular grooves arranged to constitute bearings for the inner projecting ends 14 of radial shafts 17. These shafts 17 bear beveled pinions 16 intermeshing with the gear 9 and receive motion therefrom. The outer portions of the contacting faces of the members 10 and 11 are further provided with semi-circular registering grooves to constitute bearings for the outer ends of the shafts 17. The outer end of each of the shafts 17 is provided with a head 18 in which are formed a plurality of peripheral grooves 19 spaced from each other and extending parallel with the axes of the shafts 17. Each of the members 10 and 11 is provided with a semi-circular channel 20 so that when the members 10 and 11 are in abutting relation they constitute an annular groove or channel each concentric with the axis of one of the shafts 17 and spaced therefrom to leave a sufficient portion of the material of each of the members 10 and 11 to form a journal-bearing surrounding each of the shafts 17. Communicating with each of said channels 20 is a cylindrical recess 21 in transverse alinement with each of the heads 18. The wall of each of the members 10 and 11 which surrounds the recess 21 is provided with a plurality of notches or grooves 22 extending parallel with respect to the axes of the shafts 17. Mounted in each of the annular grooves 20 is a cam-ring 23 held against circumferential-movement by holdfast devices 24. The inner face of each of the cam-rings 23 is flat and is adapted to be seated on the floor of its respective annular groove 20, and the outer face of each of the cam-rings is provided with an annularly-extending series of cam-shaped portions 25 (see Figs. 7 and 8). Positioned in each of the annular channels 20 is a shiftable brake shifting ring 26, shown best in Figs. 6 and 8. This ring is provided with a central opening to inclose the journal-bearing for one of the shafts 17 and is further provided with a laterally-extending apertured arm 27 arranged to extend outwardly through registering slots 28 in the two members 10 and 11. (See Fig. 2). This ring is also provided with a plurality of openings 29 arranged radially with respect to the axis of the ring and extending entirely therethrough. Each of these openings is provided at opposite ends thereof with slots 30 communicating with the openings 29. Mounted in each of the openings 29 of the ring 26 is a pair of superposed rollers 31 each of which is provided with a projecting axle arranged to be received in slots 30. The combined diameters of each pair of rollers is greater than the thickness of the ring 26, so that when mounted on one of the cam-rings the rollers carried by said brake shifting ring will project beyond the top and bottom faces of said ring; that is to say, when the lower series of rollers in the openings 29 is mounted on the upper face of said cam-ring 23 the upper series of rollers will project above the upper or outer surface of the shiftable ring.

Mounted in each of the recesses 21 are a plurality of brake members comprising fixed and movable members alternately arranged with respect to each other and with the faces of one series arranged to frictionally-engage the complementary faces of the members of the other series and as these brakes are similarly-constructed it is thought that a description of one side of the housing will be sufficient for a perfect understanding of both. Each of the movable members comprises an annulus 33 having a central opening into which project a plurality of integral lugs 34 of such size and so disposed that when mounted in the recesses 21 each of these lugs will be seated in one of the grooves 19. The outer face of each of these movable members is circular and these annuli are of such diameter that the outer faces thereof will not touch the inner face of the wall which surrounds the recess 21. Arranged to alternate in position with respect to the position of the members 33 are a plurality of fixed brake members each of which comprises an annulus 35 having a central aperture to freely receive either of the heads 18 and with their peripheries provided with integral laterally-extending lugs 36 so disposed and of proper size to be received in the grooves 22 in the inner faces of the walls of the members 10 and 11 which form the recess 21 and hence these fixed members are thereby locked against circumferential movement by reason of the engagement of the lugs on the peripheries of the same which are interlocked with the grooves in the walls of the members 10 and 11 of the housing. The sides of the members 10 and 11 which surround the recess 21 and constitute a wall therein are exteriorly-threaded.

Mounted on the opposite ends of each of the members 10 and 11 is a cap 37 the inner annular face of which is provided with female threads to receive the exterior threads of the members 10 and 11 and the inner face of each of these caps 37 is provided with an annularly-formed ridge 38 constituting an abutment for holding the brake members from outward movement and against which said brake members may be forced in order to bring the faces of the fixed and movable members of the brake into braking relation to set up sufficient frictional engagement between them to arrest the rotation of the shafts 17 and gears 16.

The mechanism by which the brake members on opposite sides of the shaft 8 are thrown into and out of braking relation with respect to each other, is as follows. The member 10 of the housing is provided with a laterally-extending integral sleeve 39 adapted to be revolubly-mounted on the exterior face of the inner end of the bearing 6 which thus serves to support the housing for revolution about the shaft 8. Longitudinally-shiftably-mounted on the outer face of the sleeve 39 is a collar 40 provided with a circumferential groove 41 in which is mounted a ring 42 provided on opposite sides with nogs 43. The collar 40 is also provided on opposite sides with a pair of apertured ears 44 between the members of each of which is one end of a link 45 the opposite end of which is pivotally-connected to the apertured arm 27 of each of the shifting-rings 26.

The means for shifting the collar 40 on the sleeve 39 comprise a transversely-arranged shaft 46 mounted in suitable bearings in the sides of the casing 1 and provided on its outer end with a rocking-arm 47. Mounted on the shaft 46 within the casing 1 are two arms 48 the outer ends of which are pivotally-connected with the nogs 43 so that when the rocking-arm 47 is oscillated a simultaneous movement is imparted to the levers 48 causing a longitudinal shifting movement of the collar 40 for forcing the brake members into and out of braking relation with respect to each other.

The member 11 of the housing is provided with a laterally-extending annular flange 49 arranged concentrically with respect to the shaft 8. The inner face of the flange 49 is provided with a plurality of spaced longitudinally-extending grooves 50. The lateral wall of the member 11 within the flange 49 is inclined and provided with an opening 51. Mounted on the arm 4 is a bearing 52 provided on its outer face with exterior threads adjacent to said arm 4 and further provided with an annular head 53 the inner face of which is flat and at right angles to the outer surface of the bearing. The extreme outer portion of the bearing 52 is provided with a hub-like portion adapted to be received in the opening 51 in the member 11 and constitute a supporting means for the latter. Mounted in the bearing 52 is a driven shaft 54 the axis of which is preferably in alinement with the axis of the shaft 8 and this shaft is provided on its inner end with a gear 55 meshing with the gears 16. Mounted on the bearing 52 is a longitudinally-shiftable collar 56 provided on the face which opposes the head 53 with an annular rabbet. Mounted in the rabbet in the member 56 is an annular cam-plate 57 secured against rotation by means of holdfast devices 58. This cam-plate 57 is exactly the same as the cam-plate 23 shown in Fig. 7. The outer face of the bearing 52 is provided with a plurality of longitudinally-extending grooves 59 similar to the grooves in the heads 18. Mounted within the flange 49 and adjacent to the cam-plate 57 is a shifting ring 60 provided with radial recesses in each of which is mounted a pair of rollers 61 similar in all respects to the rollers 31, and the shifting ring 60 is also constructed substantially similar to the shifting ring 26 except that it is provided with an outwardly-extending integral arm 62 to the free end of which is secured (pivotally) a shifting-rod 63 extending outwardly through the side of the casing 1, by which means the partial rotation of the shifting-ring 60 is secured. Positioned between the shifting ring 60 and the head 53 are two series of alternating brake members which are constructed similar to the brake members 33 and 35, the movable members being provided with peripheral lugs to engage in the grooves 50 on the inner face of the flange 49, and the fixed members provided with inwardly-extending lugs engaging in the grooves 59 on the bearing 52, so that by shifting the position of the ring with respect to the cam-plate 57 the brake members may be thrown into and out of braking relation with respect to each other; that is to say, by swinging the shifting ring in one direction the rollers 61 will force the brake members snugly together and the outer fixed brake member against the head 53 of the bearing 52 for preventing rotation of the housing which comprises the members 10 and 11. Revolubly-mounted on the threaded portion of the bearing 52 is an annular nut 63' the outer face of which is provided with a plurality of apertures 64 into which may be inserted a tool for rotating the nut. The function of the nut is to adjust the position of the collar 56 with respect to the fixed and movable brake members, so that when the shifting ring 60 is partially revolved it will cause braking relation between the members of the brake for partially or completely preventing revolution of the housing.

The portion of the bearing 52 which is seated upon the arm 4 is longitudinally-halved and the cap for that portion of the journal-bearing which is seated upon the arm 4 is formed by a portion of a second journal bearing 65 which is secured to the lower half and also to the arm 4 through the medium of the bolts 51. The outer end of the journal bearing 65 is provided with a head 66 having the inner face thereof flat and at right angles to the shaft 54, and is also provided with a central annular recess 67 for a purpose to be later described. The outer face of the bearing 65 is threaded in a manner similar to the threaded portion of the bearing 52. Mounted on the bearing 65 is a laterally-shiftable collar 68 the face of which is oppositely-disposed with respect to the head 66 and which is provided with an annular rabbet in which is mounted an annular cam ring 69 similar in all respects to the cam ring 57. The collar 68 is held in position and adjusted through the medium of an annular nut 70 similar to the nut 63'. Fixedly secured by a key or otherwise on the shaft 54 is a cup-shaped member 71 provided with an inwardly-projecting and centrally-arranged flange 72 suitably-apertured to receive the shaft 54 and arranged to be seated in the recess 67. The outer portions of the cup-shaped member 71 are provided with an annular laterally-extending flange 73. The outer face of the bearing 65 is provided with a plurality of longitudinally-extending grooves 74 parallel with the axis of the shaft 54 and similar to the grooves 59. The inner face of the flange 73 is provided with a plurality of spaced longitudinally-extending grooves 75 similar to the grooves 50. Mounted within the flange 73 is a circumferentially-movable annular shifting ring 76 constructed similarly to the shifting ring 60 and between this ring and the inner face of the head 66 are a plurality of fixed brake members 77 provided with inwardly-projecting lugs adapted to be received in the grooves 74, alternating with which are a plurality of movable brake members 78 provided with peripheral lugs adapted to be seated in the grooves 75 so as to revolve in unison with the cup-shaped member 71. Braking relation is produced between the fixed and movable brake members by means of the partial rotation of the shifting ring 76 in the same manner as has been described with respect to the operation of the shifting ring 60 and the effect of establishing braking relation between the fixed members 77 and the movable members 78 is to arrest rotation of the shaft 54. The shifting ring 76 is provided with a radially-extending arm 79 to the outer end of which is secured a shifting lever 80 which projects laterally through the casing 1 and is provided at its outer end with means for connecting the same to controlling mechanism.

Secured to that portion of the journal bearing 65 which overlaps the arm 4 and which forms a cap for the shaft 54 is an arm 81 in the outer ends of which are threaded apertures to receive set-screws 82 which may be screwed down against the outer peripheries of the nuts 63' and 70 for locking them against unintentional movement and which when released permit the movement of these nuts for adjusting the position of the collars 56 and 68, respectively, after which they are employed for holding the nuts against reverse rotation.

The operation of the entire device is as follows, and in order to make the understanding thereof easier, it will be assumed by way of example that the shaft 8 is connected with an engine or motor adapted to run in one direction constantly and that the casing 1 is secured to a suitable portion of the frame of an automobile and that the shaft 54 is connected through suitable gearing with the axle of an automobile so that unless positively driven the shaft 54 will remain non-rotative; that is to say, the resistance of the axle of the automobile will hold the shaft 54 which is secured thereto against rotation unless operatively connected with the driving-shaft 8. The continuous rotation of the shaft 54 with the shaft 8 is prevented by said axle and the rotation of the latter shaft causes the gears 16 to travel orbitally about the gears 9 and 55 and as the shafts 17 of the gears 16 are mounted in the companion housings 10 and 11 the latter will be caused to revolve circumferentially about the axes of the alined shafts 8 and 54, during which time no motion will be communicated to the shaft 54 from the driving-shaft 8. In order to cause the shaft 54 to rotate in unison in the same direction with the shaft 8 a partial rotation is imparted to the shaft 46 by means of the crank-arm 47 which shifts the fixed and movable brake members 33 and 35 on both sides of the housings 10 and 11 into braking relation with each other which locks or partially locks the independent revolution of the gears 16 which are thereby constituted locking members for connecting the gears 9 and 55 causing the rotation of the shaft 54 in unison with the shaft 8 in the same direction. When it is desired to rotate the shaft 54 in a direction opposed to the rotation of the shaft 8 the engagement between the fixed and movable brake members carried by the housings 10 and 11 is temporarily terminated thereby permitting free rotation of the gears 16 and at the same time the shifting-rod 63 is manipulated to bring the shifting ring 60 into a position for moving the fixed and movable brake members positioned between the rollers 61 and the head 53 into braking relation which thereby locks the members 10 and 11 against revolution and holds the same fixedly in position, the effect of which will be to cause the gears 16 to act as idlers for transmitting motion from the gear 9 to the gear 55 and a simultaneous rotation of the shaft 54 in unison with the shaft 8 but in an opposite direction.

If it is desired to utilize the device as a braking instrumentality for preventing rotation of the axle to which the shaft 54 is geared, the shifting-rod 80 is manipulated to cause the shifting ring 76 to bring the fixed and movable brake members 77 and 78 into braking relation to thereby lock or partially lock the shaft 54 against rotation which of course similarly affects the axle to which the shaft 54 is geared.

If it is desired to utilize the device for performing the function of an emergency brake in such cases for instance as where the vehicle or automobile is running down hill or is traveling through momentum imparted thereto by the engine and at the same time the engine is running continuously and rotating the shaft 8 and the momentum or movement of the vehicle is independently rotating the shaft 54 the shifting-rod 63 is employed for shifting the position of the shifting ring 60 to cause the brake members positioned between the head 53 and the collar 56 to either partially or completely lock the rotation of the companion housings 10 and 11, the effect of which is that the engine will exert its power to rotate the gears 16 which is opposed by the rotation of the shaft 54 through the gear 55, the result of which is that the rotation of the shaft 54 caused by the momentum of the vehicle transmitted through the axle thereof is opposed by the engine; that is to say the normal driving power of the engine is employed to resist the rotation of the shaft 54 thereby enabling the user of the vehicle to stop the rotation of the shaft 54 much more quickly than could be ordinarily done through the brake members 77 and 78 thereby constituting an emergency brake. This gearing may be employed in various other ways to produce different results than have been heretofore described in detail, but it is thought a sufficient description of the advantages to be obtained by this device have been given to enable a person skilled in the art to thoroughly understand the construction and operation of the same.

I claim:

1. A transmission gearing comprising a driving and a driven shaft with their inner ends opposed to each other, a bevel gear mounted on each of said opposing ends, a housing mounted on said shafts and revoluble thereabout, a shaft mounted in said housing, a bevel-gear mounted on said shaft and meshing with said first-mentioned gears, a bearing in said housing for said shaft, a channel concentric with said last-mentioned shaft in said housing, a cam-ring mounted in said channel the outer face of which is provided with a plurality of cam-shaped portions, a shifting ring mounted on said cam-ring, a plurality of rollers carried by said shifting ring and arranged to run on the cam-shaped face of said cam-ring, two series of brake members, the members of one series connected with said last-mentioned shaft and rotatable therewith, the members of said second series of brake members alternating with respect to the members of the first series and interlocked with said housing for preventing their revolution, said brake members adapted to frictionally engage each other when said shifting ring is moved to one position for partially and completely arresting the rotation of said last-mentioned shaft to cause said last-mentioned gear to constitute locking means for causing simultaneous rotation of said first mentioned pair of gears and said driving shaft in unison with each other in the same direction.

2. A transmission gearing comprising a driving and a driven shaft with their inner ends opposed to each other, a bevel-gear mounted on each of said opposing ends, a housing mounted on said shafts and revoluble thereabout, a shaft mounted in said housing, a bevel-gear mounted on said shaft meshing with said first-mentioned gears, said last-named shaft provided with a head having a plurality of grooves parallel with the axis thereof, said housing provided with a recess inclosing said head and further provided with an annular channel communicating with said recess, the inner wall of said recess provided with a plurality of grooves, a cap to close the open end of said recess, a fixed ring having a plurality of cam-shaped faces mounted in said channel, a shifting-ring provided with rollers running on said cam-shaped faces, a series of fixed brake members each provided on its periphery with a lug interlocking in one of the grooves in said recess, a series of movable brake members alternating with respect to the members of said first series of clutch members and each provided with an inwardly-extending lug adapted to interlock with one of the grooves in said head whereby said second series of brake members are revolved in unison with the rotation of said last-named shaft and means for moving said brake members into and out of braking relation for controlling the rotation of said last-named shaft and gear, whereby when said brake members are moved to their inoperative position said housing will be revolved about said driving shaft and when moved to braking position said driven shaft will be moved in unison in the same direction with said driving shaft.

3. Transmission gearing comprising a driving and a driven shaft, bevel gears on said shafts, a housing loosely-mounted on said shafts, a shaft radial to said driving shaft revolubly-mounted in said housing, a bevel gear on said last-mentioned shaft meshing with said first-mentioned gears, a series of rotatable disks secured to said radial shaft and revoluble therewith, a second series of disks the members of which alternate with respect to said first series of disks secured to said housing, means for moving said disks into braking relation with respect to each other for arresting the rotation of said radial shaft and the gear carried thereby to cause the latter to constitute a lock for compelling the driven shaft and the gear carried thereon to rotate in unison with said driving shaft, substantially as described.

4. Transmission gearing comprising a driving and a driven shaft, bevel gears on said shafts, a housing loosely-mounted on said shafts, a shaft radial to said driving shaft revolubly-mounted in said housing, a bevel gear on said last-mentioned shaft meshing with said first-mentioned gears, a series of disks the members of which interlock with said radial shaft and rotatable in unison therewith, a second series of nonrevoluble disks carried by said housing the members of which alternate with respect to the members of said first series of disks and an annularly-shiftable ring for moving the members of each series into braking relation for arresting the rotation of said radial shaft and the gear carried thereby to cause the latter to constitute a lock for compelling the driven shaft and the gear carried thereon to rotate in unison with said driving shaft, substantially as described.

5. Transmission gearing comprising a driving and a driven shaft, bevel gears on said shafts, a third gear meshing with said first gears, a support for said third gear allowing a planetary movement thereof, braking means carried by said support embodying an alternating series of engaging friction disks for arresting the rotation of said third gear thereby locking said first gears against independent rotation, whereby a planetary movement of said third gear is induced.

6. Transmission gearing comprising a driving and a driven shaft, bevel gears on said shafts, a third gear meshing with said first gears, a support for said third gear allowing a planetary movement thereof, braking means carried by said support embodying an alternating series of engaging friction disks for arresting the rotation of said third gear thereby locking said first gears against independent rotation, whereby a planetary movement of said third gear is induced and mechanism for moving said friction disks into braking engagement.

7. Transmission gearing comprising a driving and a driven shaft, bevel gears on said shafts, a third gear meshing with said first gears, a support for said third gear allowing a planetary movement thereof, braking means carried by said support embodying an alternating series of engaging friction disks for arresting the rotation of said third gear thereby locking said first gears against independent rotation whereby a planetary movement of said third gear is induced and braking mechanism embodying a series of alternating friction disks engaging said support for preventing movement thereof and arranged to be used when the braking means for said third gear is in its inoperative position.

In testimony whereof I have hereunto set my hand in presence of two subscribing witnesses.

CHARLES S. HELLER.

Witnesses:
C. E. HUMPHREY,
GLENARA FOX.

---

Copies of this patent may be obtained for five cents each, by addressing the "Commissioner of Patents, Washington, D. C."